US010743269B2

(12) United States Patent
Marce et al.

(10) Patent No.: US 10,743,269 B2
(45) Date of Patent: Aug. 11, 2020

(54) COORDINATED TIMING SYNCRONIZATION AND TIME-AWARE SHAPING

(71) Applicant: Nokia Solutions and Networks Oy, Espoo (FI)

(72) Inventors: Olivier Marce, Massy (FR); Brice Leclerc, Arpajon (FR); Maël Guiraud, Trappes (FR)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/199,857

(22) Filed: Nov. 26, 2018

(65) Prior Publication Data

US 2020/0169972 A1    May 28, 2020

(51) Int. Cl.
| | |
|---|---|
| H04W 56/00 | (2009.01) |
| H04L 12/875 | (2013.01) |
| H04L 12/841 | (2013.01) |
| H04L 12/715 | (2013.01) |
| H04L 12/863 | (2013.01) |
| H04W 84/20 | (2009.01) |

(52) U.S. Cl.
CPC .......... *H04W 56/001* (2013.01); *H04L 45/64* (2013.01); *H04L 47/283* (2013.01); *H04L 47/56* (2013.01); *H04L 47/6295* (2013.01); *H04W 56/0055* (2013.01); *H04W 84/20* (2013.01)

(58) Field of Classification Search
None
See application file for complete search history.

(56) References Cited

U.S. PATENT DOCUMENTS

| | | | | |
|---|---|---|---|---|
| 10,536,959 | B2 * | 1/2020 | Barabell | H04W 72/1263 |
| 2014/0006837 | A1 * | 1/2014 | Hann | G06F 1/12 |
| | | | | 713/400 |
| 2018/0183729 | A1 * | 6/2018 | Alsup | H04L 49/3036 |
| 2018/0237039 | A1 * | 8/2018 | Mong | B61L 15/0081 |
| 2019/0045246 | A1 * | 2/2019 | Ghangam | H04N 5/04 |

(Continued)

OTHER PUBLICATIONS

Nasrallah et al., "Ultra-Low Latency (ULL) Networks: A Comprehensive Survey Covering the IEEE TSN Standard and Related ULL Research", arXiv.org Submission, arXiv: 1803.07673v1, Mar. 20, 2018, 59 pages.

(Continued)

*Primary Examiner* — Jamaal Henson (57) ABSTRACT

A node is deployed along a path between a master device and a slave device. In some cases, the path includes additional nodes. The node includes a plurality of queues configured to be associated with a corresponding plurality of flows. A first queue of the plurality of queues is configured to be associated with a first flow that conveys timing messages for synchronizing the master device and the slave device. A scheduler is configured to schedule messages from the first queue during an extended time window that encompasses expected arrival times of a first set of timing messages in the first flow. The node reverts to normal behavior in response to completing processing of the first set of timing messages. During normal operation, the node schedules messages from the first queue during a default time window that is shorter than the extended time window.

20 Claims, 6 Drawing Sheets

(56) References Cited

U.S. PATENT DOCUMENTS

2019/0045475 A1* 2/2019 Kasichainula ..... G05B 19/0423
2019/0253339 A1* 8/2019 Mehmedagic ........ H04L 45/121

OTHER PUBLICATIONS

Grossman, "Deterministic Networking Use Cases", Internet Engineering Task Force, Internet-Draft, Jun. 26, 2018, 90 pages.
Stanton, "Distributing Deterministic, Accurate Time for Tightly Coordinated Network and Software Applications: IEEE 802.1AS, The TSN Profile of PTP", IEEE Communications Standards Magazine, vol. 2, Issue 2, Jun. 2018, 7 pages.
"Installing IOS SW TSN Support on a Cisco IE4000 Switch", Cisco Systems, Inc., Mar. 9, 2017, 24 pages.
Pedretti et al., "Nanoseconds Timing System Based on IEEE 1588 FPGA Implementation", arXiv.org Submission, arXiv:1806.04586v2, Jun. 19, 2018, 8 pages.

* cited by examiner

COORDINATED TIMING SYNCRONIZATION AND TIME-AWARE SHAPING

BACKGROUND

Upcoming generations of wireless communication systems, such as Fifth Generation (5G) communication systems, are expected to enable applications such as virtual reality, augmented reality, reliable remote operation of machines, factory automation, network-assisted control of traffic and self-driving vehicles, and the cellular "Internet of Things (IoT)" that supports internetworking of physical devices such as appliances, vehicles, buildings, and other items that are embedded with electronics, software, sensors, actuators, and network connectivity that enable the devices to collect and exchange data over the Internet. One key feature of 5G communication systems is Ultra-Low Latency Reliable Communication (ULLRC) that targets end-to-end latencies of 1 millisecond (ms) (e.g., to support factory automation applications) and reliabilities of at least 99.999% (e.g., for automotive traffic control applications such as platooning). Another key feature of 5G communication systems is that most of the signal processing is done in the network by cloud servers rather than close to the radio antennas that support wireless communication, e.g., with IoT devices. The cloud server architecture is referred to herein as Cloud Radio Access Network (C-RAN). The latency requirements for C-RAN are even more stringent: round trip time budgets are expected to be in the range of 200 to 500 microseconds (µs). Although described herein in the context of a 5G communication system, the C-RAN architecture is also implemented in other communication systems such as Fourth Generation (4G) communication systems. A third key feature of 5G communication systems is network slicing, which permits operators to allocate resources of all types (network, CPU, storage) to a given service, without interfering with other services provided by the system.

SUMMARY

The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In some embodiments, an apparatus includes a plurality of queues configured to be associated with a corresponding plurality of flows. A first queue of the plurality of queues is configured to be associated with a first flow that conveys timing messages for synchronizing a master device and a slave device. The apparatus also includes a scheduler configured to forward messages from the first queue during an extended time window that encompasses expected arrival times of a first set of timing messages in the first flow.

In some embodiments, a method includes associating, at a node, a first queue with a first flow that conveys timing messages for synchronizing a master device and a slave device. The first queue is one of a plurality of queues configured to be associated with a corresponding plurality of flows. The method also includes scheduling, at the node, messages from the first queue during an extended time window that encompasses expected arrival times of a first set of timing messages in the first flow.

In some embodiments, an apparatus includes means for associating, at a node, a first queue with a first flow that conveys timing messages for synchronizing a master device and a slave device. The first queue is one of a plurality of queues configured to be associated with a corresponding plurality of flows. The apparatus also includes means for scheduling, at the node, messages from the first queue during an extended time window that encompasses expected arrival times of a first set of timing messages in the first flow.

In some embodiments, an apparatus includes at least one processor and at least one memory including computer program code. The at least one memory and the computer program code are configured to, with the at least one processor, cause the apparatus at least to perform associating, at a node, a first queue with a first flow that conveys timing messages for synchronizing a master device and a slave device. The first queue is one of a plurality of queues configured to be associated with a corresponding plurality of flows. The at least one memory and the computer program code are also configured to, with the at least one processor, cause the apparatus to perform scheduling, at the node, messages from the first queue during an extended time window that encompasses expected arrival times of a first set of timing messages in the first flow.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Conventional communication systems use statistical multiplexing to transfer data between a core network and a signal processing unit (e.g., through the "backhaul" network) and between the signal processing unit and a base station (e.g., through the "fronthaul" network). However, statistical multiplexing does not support low latency communication due to collisions between packets at nodes in the network (e.g., ethernet switches) and buffering of packets at the nodes. Furthermore, statistical multiplexing does not deliver proper slice isolation in systems that employ network slicing and a given resource could be required at the same time by two different services. For example, two services implemented using different network slices could use the same resources to forward packets.

In order to meet the stringent latency requirements of ULLRC and C-RAN, as well as supporting network slicing, communication systems are configured to perform "deterministic networking" in which packet arrival times and latencies are known accurately in advance. One deterministic networking technique is time-aware shaping of packets that are scheduled for transmission by a transmission scheduler that selects packets for scheduling from a set of ingress queues. A gate control list (GCL) identifies the ingress queues that are considered by the transmission scheduler in a sequence of time intervals that are referred to as traffic windows. The pattern of ingress queues that are considered in each traffic window is referred to as a gate control entity (GCE). The GCL is therefore a list of GCEs for the sequence of traffic windows. In some cases, such as a chassis-based system, deterministic scheduling using TAS and a GCL is also performed at egress. For example, an ingress scheduler can pick up a packet with low latency and process the packet. After the packet is processed at ingress, the packet is sent to an egress queue in the appropriate egress card via a switch fabric. The egress queue is synchronized so that the packet can be sent to the egress card substantially immediately. The egress card performs the egress related processing and enqueues the packet to the egress queue in response to receiving the packet. The egress queue is served by TAS and the GCL.

Time-aware shaping based on the GCL can prevent collision and buffering of packets if the nodes in the communication system are synchronized at a time granularity that is equal to or finer than the precision of the time-aware traffic windows. Different flows are mapped to different ingress queues or, in some cases, egress queues. The GCL defines time-aware traffic windows in which only packets from ingress or egress queues corresponding to specified flows are allowed to be transmitted. For example, the GCL can be configured so that only a first queue associated with a first flow is considered by the scheduler in a time window that corresponds to the time that a first frame in the first flow is expected to arrive in the first queue. All other queues are closed by the GCL in that time window. The scheduler then schedules the only available frame—the first frame in the first queue—for transmission, thereby avoiding collisions and the resulting transmission delays. In some cases, time-aware shaping allows lower priority frames to be transmitted (e.g., in conjunction with the packets from the first ingress or egress queue) if the lower priority frames do not collide with a higher priority frame that would be admitted in the next time-aware traffic window (e.g., a packet from the first ingress or egress queue). As long as no other frames of the same or higher priority (or lower priority frames that are expected to collide with the first frame) are considered for transmission at the time that the first frame arrives in the first queue, transmission of the first frame is deterministic and proceeds with low latency and jitter.

As discussed above, time-aware shaping requires a high degree of time synchronization between nodes in the communication system. If the nodes are not time synchronized, the nodes will expect a frame to arrive at different actual times. For example, if a first node transmits a frame that is scheduled to arrive at a second node at a first time, but the first node is not synchronized with the second node, the frame may arrive at a second time that is not equal to the first time. The lack of time synchronization can lead to collisions, buffering, and delays. The nodes in the communication system are usually synchronized using a message exchange such as messages exchanged according to the IEEE 1588 protocol that supports a clock offset correction between nodes in the communication system. Synchronization is acquired by exchanging timestamp messages between the nodes, such as a synchronization message, a delay request message, and a delay response message. The nodes compute differences between their current clock time and time stamps in the transmitted and received messages to determine an offset needed to synchronize the nodes. The accuracy of the 1588 protocol is limited by network asymmetry because the 1588 protocol assumes that delay between messages is always the same and that forward and backward delays in the communication system are also the same. The accuracy of the 1588 protocol is also limited by jitter. The accuracy of the 1588 protocol can therefore be improved using time-aware shaping to reduce jitter. However, jitter is only reduced by time-aware shaping if the nodes in the communication system are already time synchronized.

FIGS. 1-6 disclose embodiments of techniques for coordinating time-aware shaping at a plurality of nodes and time synchronization of the plurality of nodes by allocating a first ingress queue (or, in some cases, a first egress queue) in each of the plurality of nodes to time synchronization messages, such as 1588 messages. One or more second ingress queues (or, in some cases, second egress queues) are allocated to other flows. In response to an indication that a time synchronization message is expected at a first time, schedulers in the plurality of nodes are configured to schedule only messages from the first queue during an extended time window that encompasses the first time. As discussed herein, in some cases the scheduler can also schedule messages from lower priority queues that do not collide with the higher priority messages in the first queue. A duration of the extended time window is determined based on an expected clock drift between the clocks running on the plurality of nodes. In some embodiments, modules in the nodes are alerted to indicate the first time that reception of a time synchronization message is expected, e.g., by signaling in a software defined network (SDN). In response to receiving the alert, gate control lists (GCLs) in the nodes are configured with a first gate control entity (GCE) that opens the first queue and closes the second queues to allow exchange of the time synchronization messages. In response to completing the message exchange, or in response to signaling from the SDN, the GCL is configured with second GCEs that allow the scheduler to schedule frames from one or more of the second queues. In other embodiments, the modules trigger configuration of the GCL with the first GCE in response to receiving a time synchronization message. Subsequent time synchronization messages are therefore forwarded without delay or jitter. The first time synchronization message may or may not be discarded. Each of the plurality of nodes reverts to normal behavior by reducing the extended guard time interval for the first queue to a normal guard time interval that is shorter than the extended guard time interval once the initial time synchronization is completed.

Figure 1:
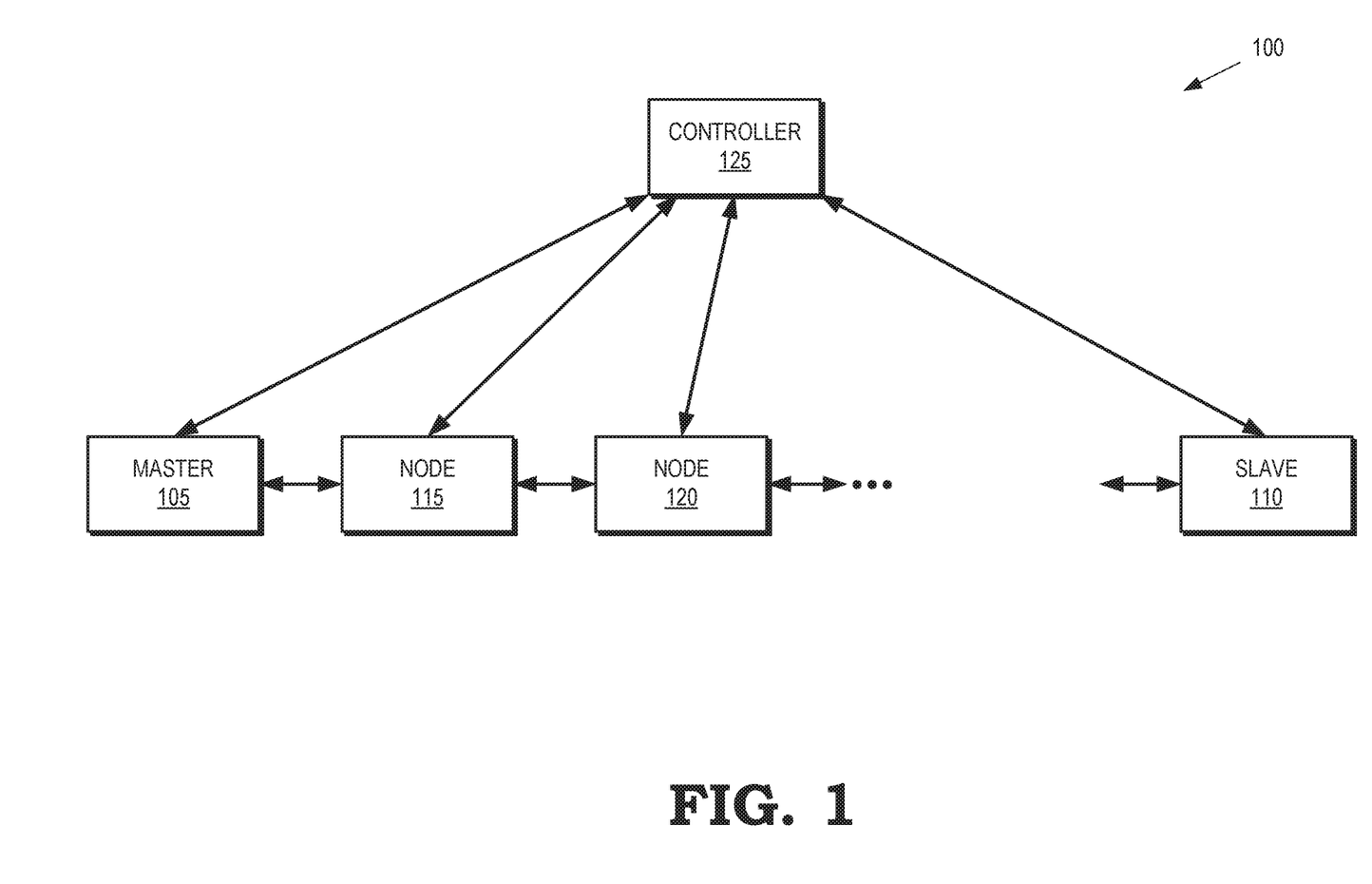
FIG. 1 is a block diagram of a communication system that includes a master device and a slave device according to some embodiments.

FIG. 1 is a block diagram of a communication system 100 that includes a master device 105 and a slave device 110 according to some embodiments. The master device 105 and the slave device 110 implement deterministic networking so that packet arrival times and latencies are known accurately in advance. Some embodiments of the master device 105 and the slave device 110 are therefore configured to perform time-aware shaping of packets that are scheduled for transmission by a transmission scheduler that selects packets for scheduling from a set of ingress queues (or, in some cases, egress queues). Packets that are conveyed between the master device 105 and the slave device 110 traverse one or more nodes. In the illustrated embodiment, the communication system 100 includes nodes 115, 120 between the master device 105 and the slave device 110. However, more or fewer nodes are implemented between the master device 105 and the slave device 110 in some embodiments.

In the illustrated embodiment, the communication system 100 implements a controller 125 such as a software defined networking (SDN) controller. The controller 125 exchanges signaling with the master device 105, the slave device 110, and the nodes 115, 120 to coordinate operation of these entities in the communication system 100. For example, the controller 125 can provide signals indicating the beginning and ending of extended time intervals that are used to perform timing synchronization between the master device 105 and the slave device 110, as discussed herein. However, the communication system 100 is not required to implement a controller 125 in order to perform some embodiments of the coordinated timing synchronization and time-aware shaping disclosed herein.

As discussed above, time-aware shaping allows packets to be transmitted deterministically from the master device 105 to the slave device 110, provided that timing at the master device 105 is synchronized with timing at the slave device 110 at a time granularity that is equal to or finer than the precision of the time-aware traffic windows. However, the accuracy of a timing synchronization of the master device 105 and the slave device 110, e.g., according to the 1588 protocol, is limited by the amount of jitter and the packet arrival times, which is only reduced by time-aware shaping if the nodes in the communication system are already time synchronized. Thus, the problem of providing accurate time-aware shaping between synchronize nodes is a kind of chicken-and-egg problem.

To address this problem, time-aware shaping and timing synchronization between the master device 105 and the slave device 110 is coordinated by temporarily enlarging a time window that is available for exclusive use of a message flow that is used to transmit the timing synchronization messages such as 1588 messages. Some embodiments of the nodes 115, 120 in the communication system 100 include queues (not shown in FIG. 1 in the interest of clarity) that are associated with corresponding flows. One of the queues is associated with a timing flow that conveys timing messages for synchronizing the master device 105 and the slave device 110. Schedulers in the nodes 115, 120 only schedule messages from the queue associated with the timing flow during an extended time window that encompasses expected arrival times of timing messages in the timing flow. As discussed herein, in some cases the schedulers in the nodes 115, 120 can also schedule messages from lower priority queues that do not collide with the messages from the queue associated with the timing flow, thereby preserving deterministic transmission of messages in the timing flow. Thus, all the forwarding resources of the nodes 115, 120 are available for the timing messages during the extended time interval and these messages suffer no contention latency or jitter. The timing synchronization process therefore efficiently and accurately computes any necessary timing offset between the master device 105 and the slave device 110.

In some embodiments, the timing synchronization process is also used to synchronize the nodes 115, 120 with the master device 105. The extended time window is also used for this synchronization process. Once the nodes 115, 120 align their clocks with the master device 105, the time window for the queue associated with the timing flow is reduced to a default timing window. One or other queues can also be unlocked so that the packets in the flows associated with the other queues are available for scheduling. In some embodiments, the controller 125 provides signaling to initiate the coordinated timing synchronization in time-aware shaping process, e.g., by applying the extended time window and closing all of the queues except for the queue associated with the timing flow. The controller 125 also provides signaling to return the nodes 115, 120 to normal operation by reducing the extended time window to the default time window and allowing other queues to be scheduled.

An example sequence of events for coordinating timing synchronization in time-aware shaping includes the controller 125 triggering the master device 105 to transmit a synchronization message. The node 115 informs the controller 125 in response to receiving the synchronization message. The controller 125 then configures the nodes 115, 120 so that only queues associated with the timing flow are open for scheduling and other queues are closed. The master device 105 and the slave device 110 perform a synchronization message exchange, which is performed with reduced delay and jitter because of the open queue for the timing flow. Subsequently, the master device 105 begins a new message exchange to refine or improve the timing synchronization. One or more of the nodes 110, 115 inform the controller 125 that they have received timing messages from the master device 105. The master device 105 and the slave device 110 compute more accurate timing synchronization using the subsequent message exchange. Once the timing synchronization is complete, the controller 125 configures the nodes 110, 115 to use default time intervals, which are shorter than the extended time interval, and normal gate control lists to control scheduling of the different queues.

Figure 2:
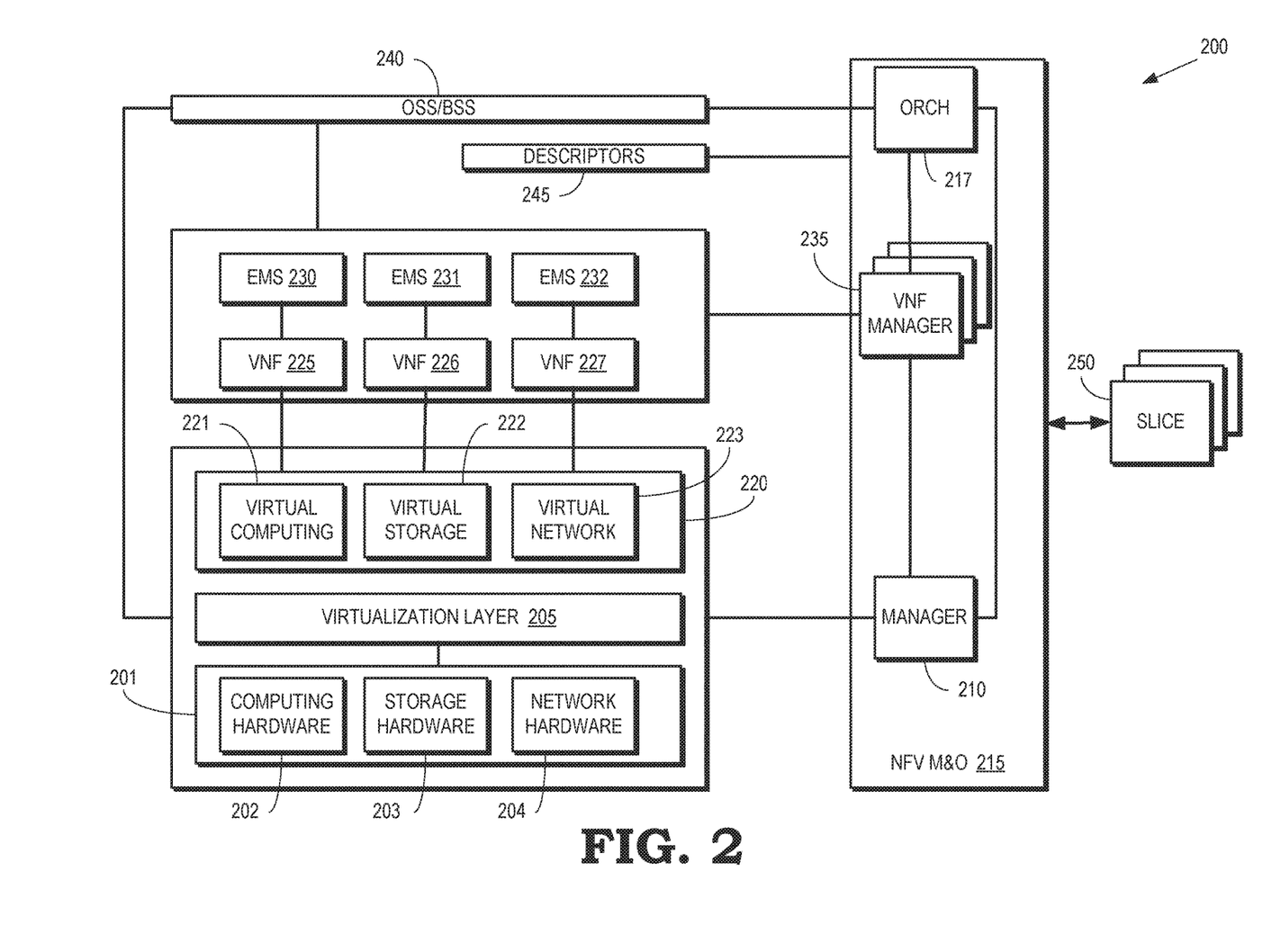
FIG. 2 is a block diagram of a network function virtualization (NFV) architecture according to some embodiments.

FIG. 2 is a block diagram of a network function virtualization (NFV) architecture 200 according to some embodiments. The NFV architecture 200 is used to implement some embodiments of the communication system 100 shown in FIG. 1. For example, the NFV architecture 200 is used to implement some embodiments of the controller 125 shown in FIG. 1. The NFV architecture 200 includes hardware resources 201 including computing hardware 202 such as one or more processors or other processing units, storage hardware 203 such as one or more memories, and network hardware 204 such as one or more transmitters, receivers, or transceivers. A virtualization layer 205 provides an abstract representation of the hardware resources 201. The abstract representation supported by the virtualization layer 205 can be managed using a virtualized infrastructure manager 210, which is part of the NFV management and orchestration (M&O) module 215. Some embodiments of the manager 210 are configured to collect and forward performance measurements and events that may occur in the NFV architecture 200. For example, performance measurements may be forwarded to an orchestrator (ORCH) 217 implemented in the NFV M&O 215. The hardware resources 201 and the virtualization layer 205 may be used to implement virtual resources 220 including virtual computing resources 221, virtual storage resources 222, and virtual networking resources 223.

Virtual networking functions (VNF) 225, 226, 227 run over the NFV infrastructure (e.g., the hardware resources 201) and utilize the virtual resources 220. For example, the virtual networking functions 225-227 using virtual machines supported by the virtual computing resources 221, virtual memory supported by the virtual storage resources 222, or virtual networks supported by the virtual network resources 223. Element management systems (EMS) 230, 231, 232 are responsible for managing the virtual networking functions 225-227. For example, the element management systems 230-232 may be responsible for fault and performance management. In some embodiments, each of the virtual networking functions 225-227 is controlled by a corresponding VNF manager 235 that exchanges information and coordinates actions with the manager 210 or the orchestrator 217.

The NFV architecture 200 may include an operation support system (OSS)/business support system (BSS) 240. The OSS/BSS 240 deals with network management including fault management using the OSS functionality. The OSS/BSS 240 also deals with customer and product management using the BSS functionality. Some embodiments of the NFV architecture 200 use a set of descriptors 245 for storing descriptions of services, virtual network functions, or infrastructure supported by the NFV architecture 200. Information in the descriptors 245 may be updated or modified by the NFV M&O 215.

The NFV architecture 200 can be used to implement network slices 250 that provide user plane or control plane functions. A network slice 250 is a complete logical network that provides communication services and network capabilities, which can vary from slice to slice. User equipment can concurrently access multiple slices. Some embodiments of user equipment provide Network Slice Selection Assistance Information (NSSAI) parameters to the network to assist in selection of a slice instance for the user equipment. A single NSSAI may lead to the selection of several slices. The NFV architecture 200 can also use device capabilities, subscription information and local operator policies to do the selection. An NSSAI is a collection of smaller components, Single-NSSAIs (S-NSSAI), which each include a Slice Service Type (SST) and possibly a Slice Differentiator (SD). Slice service type refers to an expected network behavior in terms of features and services (e.g., specialized for broadband or massive IoT), while the slice differentiator can help selecting among several network slice instances of the same type, e.g. to isolate traffic related to different services into different slices.

Figure 3:
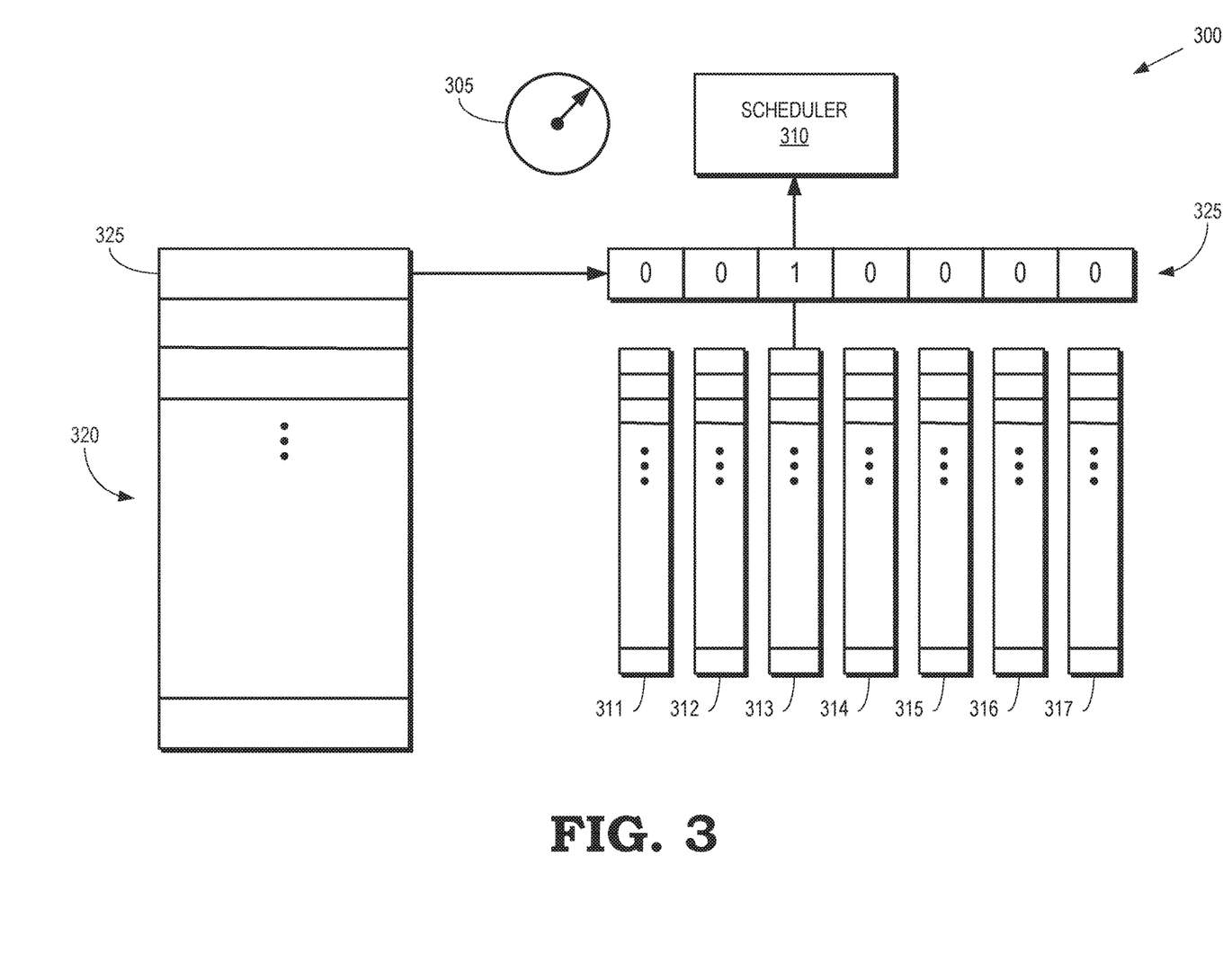
FIG. 3 is a block diagram of a node that performs coordinated timing synchronization and time-aware shaping according to some embodiments.

FIG. 3 is a block diagram of a node 300 that performs coordinated timing synchronization and time-aware shaping according to some embodiments. The node 300 is used to implement some embodiments of the nodes 115, 120 shown in FIG. 1. The node 300 includes a clock 305 that establishes timing of functions executed in the node 300. The timing synchronization is used to identify and apply offsets to the clock 305 so that the clock 305 is synchronized with corresponding clocks in other nodes, as well as a master device such as the master device 105 shown in FIG. 1 and a slave device such as the slave device 110 shown in FIG. 1. The node 300 also includes a scheduler 310 that schedules packets for transmission from a set of queues 311, 312, 313, 314, 315, 316, 317, which are collectively referred to herein as "the queues 311-317."

The scheduler 310 performs time-aware shaping of the packets in the queues 311-317. Some embodiments of the scheduler 310 operate according to standards defined by IEEE 802.1 TSN group such as 802.1Qbv Time-Aware Shaper (TAS). In order to perform time-aware shaping, the queues 311-317 are associated with different flows. Some embodiments of the flows are time sensitive networking (TSN) flows (or data link flows) that are characterized by quality of service (QoS) properties (e.g., bandwidth and latency) for the traffic class of the flow. For example, a TSN flow is defined by the priority code point (PCP) field and VLAN ID (VID) within the 802.1Q VLAN tag in an Ethernet header.

The node 300 includes a gate control list (GCL) 320 that defines, for successive time intervals, which queues 311-317 are considered by the scheduler 310. The subsets of the queues 311-317 that are available for scheduling by the scheduler 310 in each time interval are defined by gate control entities (GCE) 325 (only one indicated by a reference numeral in the interest of clarity). The gate control entity 325 includes information that determines the subsets of the queues 311-317 that are available for scheduling. For example, a value of (0) in an entry of the gate control entity 325 indicates that a gate for the corresponding queue is closed and the scheduler 310 does not consider the queue. A value of (1) in an entry of the gate control entity 325 indicates that a gate for the corresponding queue is open and the scheduler 310 considers the queue. A gate is open for a time interval that is referred to as the time-aware traffic window. Frames are transmitted according to the patterns defined by the gate control list 320 and transmission selection decisions made by the scheduler 310.

The gate control list 320 and the gate control entities 325 are used to define time-aware traffic windows in which only some specific flows are allowed to be transmitted. The frames from the other flows that are received within the considered time window are then queued. In the illustrated embodiment, the gate control entity 325 opens the gate for the queue 313 and closes the gate for the remaining queues 311, 312, 314-317. Thus, the scheduler 310 only schedules packets or frames from the queue 313 during a time interval associated with the gate control entity 325. The queue 313 is associated with a timing flow that is used to perform timing synchronization between a master device, a slave device, and other nodes in a network that includes the node 300. The time interval for opening the gate associated with the queue 313 is set to an extended time interval to facilitate timing synchronization, as discussed herein. The time intervals for other gate control entities in the gate control list 320 are set to default time intervals that are shorter than the extended time interval.

Some embodiments of the node 300 implement a version of TAS that allows transmission of a lower priority frame (e.g., a frame from one of the queues 311, 312, 314-317) if the lower priority frame will not collide with a higher priority frame that would be emitted in a next time-aware traffic window, e.g., a frame from the queue 313. The scheduler 310 therefore implements a strict scheduling algorithm that prevents another frame of the same of higher priority from being under transmission concurrently with a higher priority frame arriving at the queue 313, which leads a deterministic transmission of frames.

Figure 4:
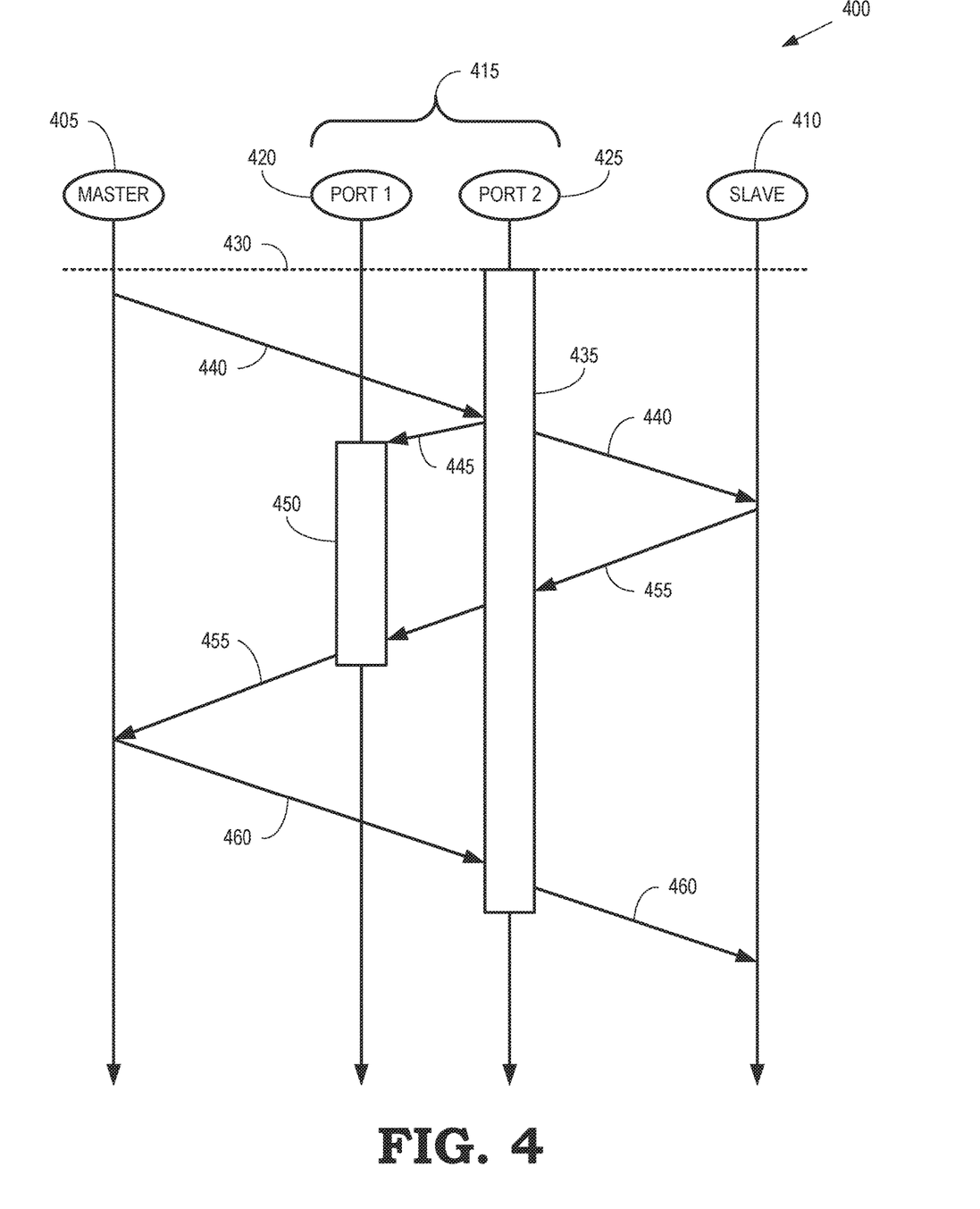
FIG. 4 is a timing diagram of deterministic transmission of messages used to synchronize timing of a master device and a slave device using an extended time interval at an intervening node according to some embodiments.

FIG. 4 is a timing diagram 400 of deterministic transmission of messages used to synchronize timing of a master device and a slave device using an extended time interval at an intervening node according to some embodiments. The timing diagram 400 illustrates messages exchanged by a master device 405, a slave device 410, and a node 415 that includes a first port 420 and a second port 425.

Coordination of timing synchronization and time-aware shaping begins in response to an event 430. In some embodiments, the event 430 is the arrival of a timing synchronization message at the node 415. The initial timing synchronization message can be dropped or forwarded in different embodiments. In other embodiments, the event 430 is a signal from a network entity such as the SDN controller 125 shown in FIG. 1. In response to the event 430, the node 415 configures a gate control list and a corresponding gate control entity to forward timing messages without delay or jitter, e.g., by opening a gate for a queue associated with the flow that carries the timing messages and closing gates for any other queues at the node 415. The control entity that opens the gate for the timing flow remains open for a timing window 435 having an extended time interval. The event 430 can also be a node initialization event, a manual set up event, and the like. In some embodiments, the duration of the extended time interval of the timing window 435 is determined based on an expected clock drift between clocks running on the master device 405, the slave device 410, and the node 415. For example, the clock drift that is expected between the clocks can be determined based on properties of the clocks, a measured relative drift between the clocks, empirically, or using other techniques for determining or estimating the clock drift.

The master device 405 transmits a set of timing messages to the node 415. The set of timing messages includes a synchronization message 440 that is transmitted to the node 415, which forwards the synchronization message 440 from the second port 425. In response to receiving the synchronization message 440 from the master device 405, the node 415 configures (at arrow 445) the gate control list of the first port 420 with a unique gate control entity that opens a gate for queue associated with the timing flow and closes gates for any other queues. The gate for the first port 420 remains open for a timing window 450. The open gate at the first port 420 is used to convey subsequent timing messages without delay or jitter. The timing window 450 is open for an extended time interval, although the extended time interval for the timing window 450 may be different than the extended time interval of the timing window 435. In both cases, the extended time interval is longer than a default time interval for the gate control entities in the gate control list.

The slave device 410 transmits a delay request message 455 that is received at the second port 425 of the node 415 and then transmitted from the first port 420. In the illustrated embodiment, the delay request message 455 is the last timing message that is transmitted from the node 415 to the master device 405. The timing window 450 is therefore closed once the delay request message 455 has been sent. The extended time interval is returned to the default time interval for subsequent gate control entities in the gate control list.

The master device 405 response to the delay request message by transmitting a delay response message 460, which is received by the node 415 and forwarded to the slave device 410 via the second port 425. In the illustrated embodiment, the delay response message 460 is the last timing message that is transmitted from the node 415 to the slave device 410. The timing window 435 is therefore closed once the delay response message 460 has been sent. The extended time interval is returned to the default time interval for subsequent gate control entities in the gate control list. Although the timing window 435 is closed in response to transmission of the delay response message 460 in the illustrated embodiment, other embodiments close the timing window 435 in response to signaling from other entities such as an SDN controller, in response to expiry of a predetermined extended time interval, and the like.

Figure 5:
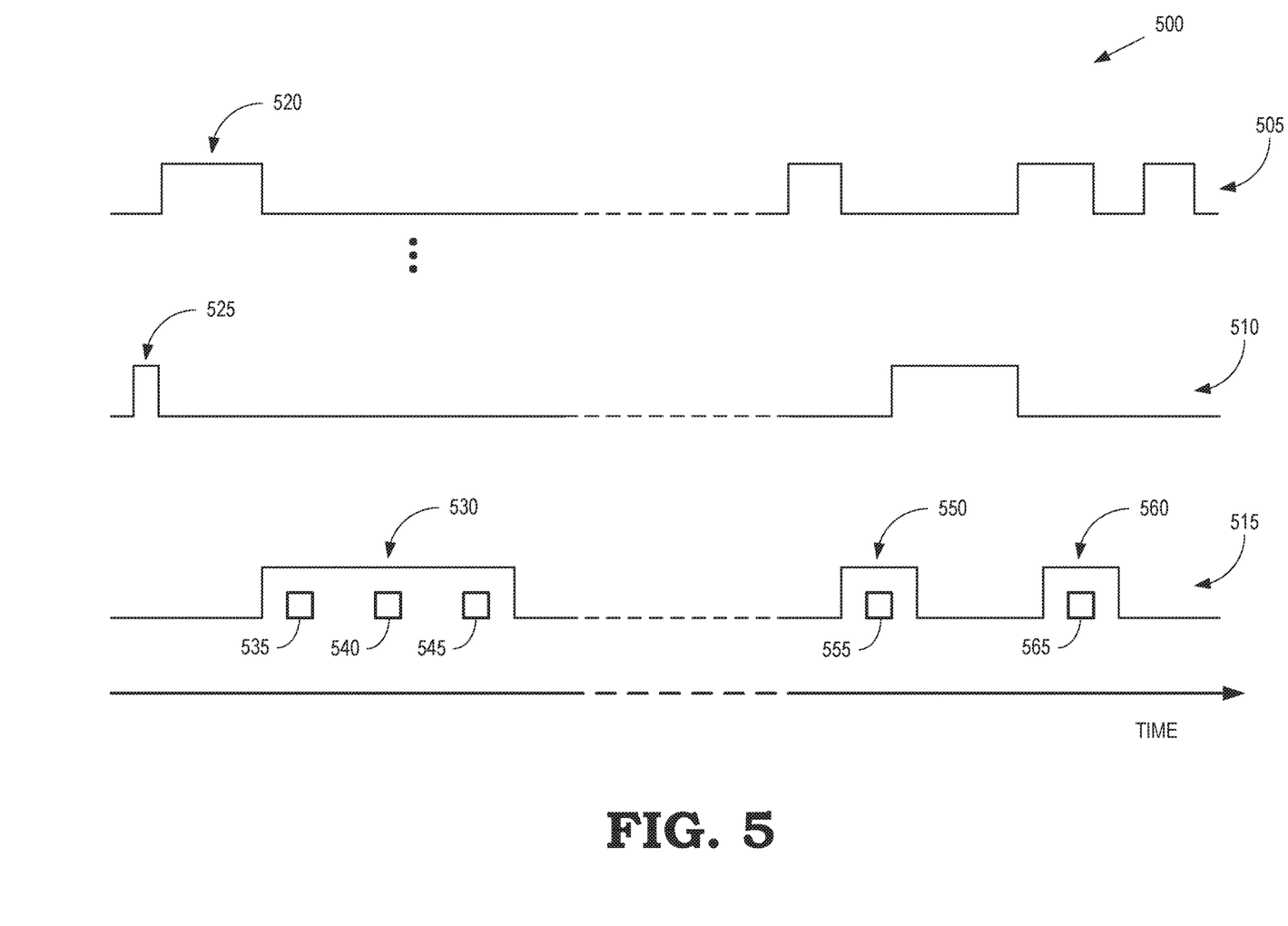
FIG. 5 illustrates a gating pattern that is used to support coordinated timing synchronization and timing aware scheduling according to some embodiments.

FIG. 5 illustrates a gating pattern 500 that is used to support coordinated timing synchronization and timing aware scheduling according to some embodiments. The gating pattern 500 is applied by some embodiments of the nodes 115, 120 shown in FIG. 1 and the node 300 shown in FIG. 3. Time increases from left to right in FIG. 5 and the gating pattern 500 shows patterns of open and closed gates for a first queue 505, a second queue 510, and a third queue 515 that is associated with a timing flow such as a flow that carries 1588 messages to synchronize a master device and the slave device. The gates for the queues 505, 510, 515 are open when the corresponding signal is high and closed when the corresponding signal is low. For example, the gate for the queue 505 is open during the time interval 520 and the gate for the queue 510 is opened during the time interval 525.

A gate for the queue 515 is open during an extended time interval 530. Gates for the queues 505, 510, and any other queues supported by the node are closed during the extended time interval 530. The duration of the extended time interval 530 is determined to allow sufficient time for a synchronization message 535 to be received from a master device and forwarded by the node to a slave device. The extended time interval 530 also allows sufficient time for a delay request 540 to be received from the slave device and forwarded to the master device, and for a delay response 545 to be received from the master device and forwarded to the slave device. In some embodiments, the extended time interval 530 is used during an initialization phase of the node at least in part because timing synchronization between the master device, the slave device, and the node may be insufficient to ensure that the messages 535, 540, 545 would be received by the node at a time that corresponds to an open gate for the timing flow.

Some embodiments of the node return to normal behavior using default time intervals for the gating patterns during a subsequent phase, e.g., after sufficient timing synchronization has been achieved between the master device, the slave device, the node during an initialization phase. In the illustrated embodiment, the node opens the gate for the timing flow during the default time interval 550 to receive and forward a message 555 and the default time interval 560 to receive and forward a message 565.

Figure 6:
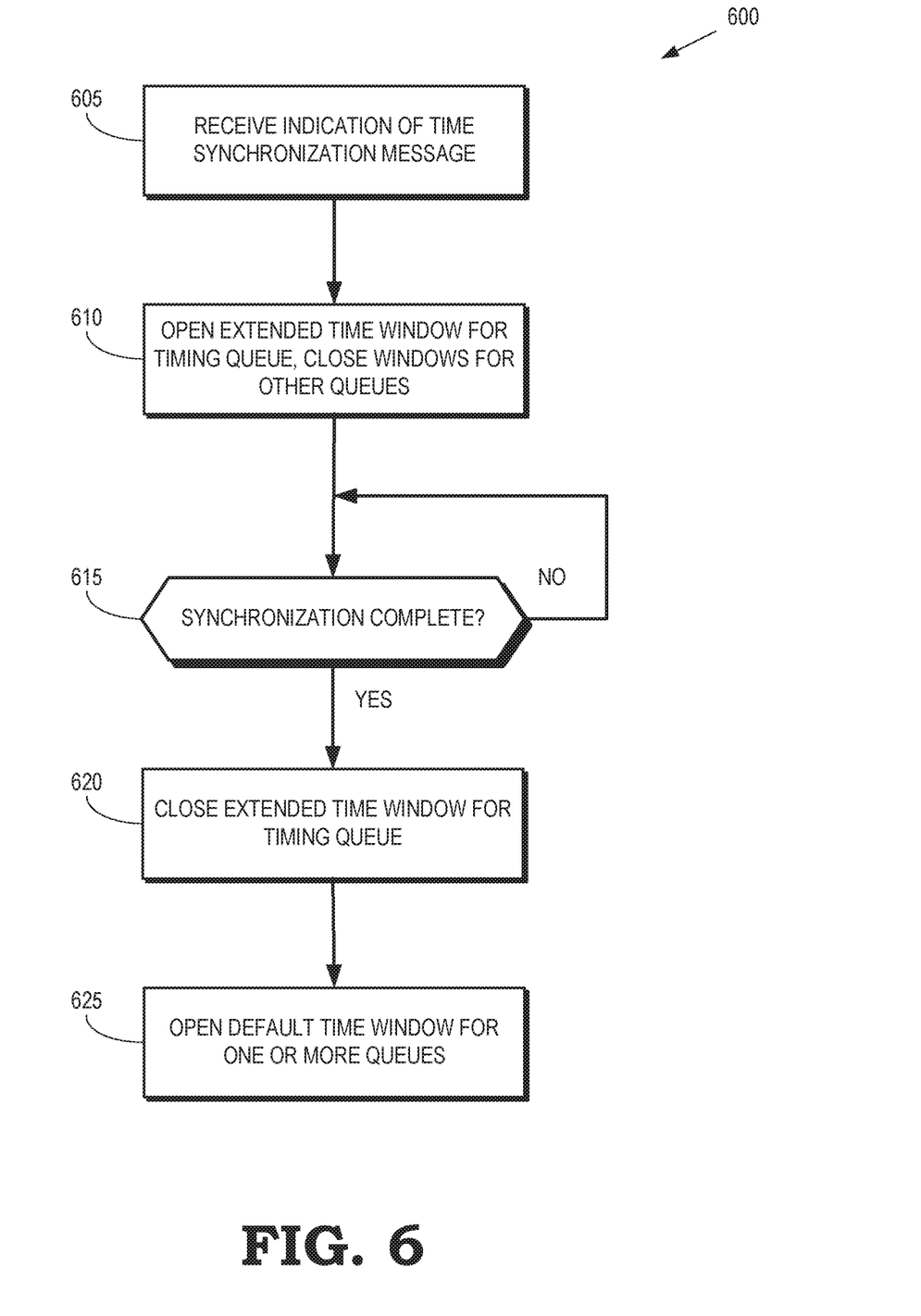
FIG. 6 is a flow diagram of a method of opening an extended time window to support coordinated timing synchronization and time-aware shaping according to some embodiments.

FIG. 6 is a flow diagram of a method 600 of opening an extended time window to support coordinated timing synchronization and time-aware shaping according to some embodiments. The method 600 is implemented in some embodiments of the nodes 115, 120 shown in FIG. 1 and the node 300 shown in FIG. 3.

At block 605, the node receives an indication of a time synchronization message. The indication can be signaling from a controller such as an SDN controller, a first time synchronization message received from a master device, or other indication. In response to receiving the indication, the node opens (at block 610) an extended time window for a timing queue associated with a timing flow and closes windows for other queues. In some embodiments, the timing queue is opened and the other queues are closed using a gate control entity from a gate control list.

At decision block 615, the node determines whether the timing synchronization process is complete. Completion of the timing synchronization process is detected in response to receiving and forwarding a final message in a timing message exchange, in response to signaling from the controller, in response to expiry of the predetermined extended time interval, and the like. If the timing synchronization process is not complete, the node keeps the date for the timing queue open and the other gates closed. In response to the no determining that the timing synchronization is complete, the method 600 flows to block 620.

At block 620, the node closes the extended time window for the timing queue in response to determining that the timing synchronization process is complete. At block 625, the node opens a default time window for one or more of the other queues to allow a scheduler to schedule packets or frames from other flows besides the timing flow. For example, the node can apply a new gate control entity that closes the gate for the timing queue and opens one or more gates for other queues. The default time window is shorter than the extended time window.

In some embodiments, certain aspects of the techniques described above may be implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
a plurality of queues configured to be associated with a corresponding plurality of flows, wherein a first queue of the plurality of queues is configured to be associated with a first flow that conveys timing messages for synchronizing a master device and a slave device; and
a scheduler configured to forward messages from the first queue during an extended time window that encompasses expected arrival times of a first set of timing messages in the first flow.

2. The apparatus of claim 1, further comprising:
a clock, wherein a duration of the extended time window is determined based on an expected clock drift between the clock and clocks running on the master device and the slave device.

3. The apparatus of claim 2, wherein the apparatus is configured for deployment along a path between the master device and the slave device that includes at least one additional node, and wherein the duration of the extended time window is determined based on an expected clock drift between the clock and clocks running on the master device, the slave device, and the at least one additional node.

4. The apparatus of claim 3, further comprising:
a memory configured to store a gate control list that includes gate control entities for a sequence of scheduling time intervals, wherein the gate control entities include information identifying subsets of the plurality of queues that are scheduled by the scheduler during corresponding scheduling time intervals.

5. The apparatus of claim 4, wherein a first gate control entity in the gate control list opens the first queue for scheduling during the extended time interval and closes all other queues of the plurality of queues during the extended time interval.

6. The apparatus of claim 1, wherein the scheduler initiates forwarding the messages from the first queue during the extended time window in response to at least one of detecting arrival of a first timing message in the first set of timing messages or receiving signaling from a software defined network (SDN).

7. The apparatus of claim 1, wherein the scheduler closes the extended time window and begins scheduling messages from another subset of the plurality of queues in response to at least one of completing processing of the first set of timing messages or receiving signaling from the SDN.

8. The apparatus of claim 1, wherein the scheduler is configured to schedule messages from the first queue during a default time window that is shorter than the extended time window in response to completing processing of the first set of timing messages exchanged during the extended time window.

9. The apparatus of claim 8, wherein the first set of timing messages comprises a synchronization message received from the master device, a delay request message received from the slave device, and a delay response message received from the master device.

10. A method comprising:
- associating, at a node, a first queue with a first flow that conveys timing messages for synchronizing a master device and a slave device, wherein the first queue is one of a plurality of queues configured to be associated with a corresponding plurality of flows; and
- scheduling, at the node, messages from the first queue during an extended time window that encompasses expected arrival times of a first set of timing messages in the first flow.

11. The method of claim 10, further comprising:
- determining a duration of the extended time window based on an expected clock drift between a clock implemented in the node and clocks running on the master device and the slave device.

12. The method of claim 11, wherein the node is deployed along a path between the master device and the slave device that includes at least one additional node, and wherein determining the duration of the extended time window comprises determining the duration based on an expected clock drift between the clock implemented in the node and clocks running on the master device, the slave device, and the at least one additional node.

13. The method of claim 10, further comprising:
- storing a gate control list that includes gate control entities for a sequence of scheduling time intervals, wherein the gate control entities include information identifying subsets of the plurality of queues that are scheduled during corresponding scheduling time intervals.

14. The method of claim 13, wherein opening the first queue for scheduling during the extended time interval and closing all other queues of the plurality of queues during the extended time interval based on a first gate control entity in the gate control list.

15. The method of claim 14, further comprising:
- initiating scheduling of the messages from the first queue during the extended time window in response to at least one of detecting arrival of a first timing message in the first set of timing messages or receiving signaling from a software defined network (SDN).

16. The method of claim 14, further comprising:
- closing the extended time window and beginning scheduling messages from another subset of the plurality of queues in response to at least one of completing processing of the first set of timing messages or receiving signaling from the SDN.

17. The method of claim 10, further comprising:
- scheduling messages from the first queue during a default time window that is shorter than the extended time window in response to completing processing of the first set of timing messages exchanged during the extended time window.

18. The method of claim 10, further comprising:
- receiving a synchronization message from the master device and forwarding the synchronization message towards the slave device during the extended time window;
- receiving a delay request message from the slave device and forwarding the delay request message towards the master device during the extended time window; and
- receiving a delay response message from the master device and forwarding the delay response message towards the slave device during the extended time window.

19. An apparatus comprising:
- at least one processor; and
- at least one memory including computer program code;
- the at least one memory and the computer program code configured to, with the at least one processor, cause the apparatus at least to perform:
  - associating, at a node, a first queue with a first flow that conveys timing messages for synchronizing a master device and a slave device, wherein the first queue is one of a plurality of queues configured to be associated with a corresponding plurality of flows; and
  - scheduling, at the node, messages from the first queue during an extended time window that encompasses expected arrival times of a first set of timing messages in the first flow.

20. The apparatus of claim 19, wherein the at least one memory and the computer program code are configured to, with the at least one processor, cause the apparatus at least to perform:
- scheduling messages from the first queue during a default time window that is shorter than the extended time window in response to completing processing of the first set of timing messages exchanged during the extended time window.

* * * * *